United States Patent [19]

Watanabe et al.

[11] Patent Number: 4,600,074

[45] Date of Patent: Jul. 15, 1986

[54] ALL WHEEL DRIVE VEHICLE

[75] Inventors: Masaki Watanabe, Saitama; Akio Yagasaki, Tokyo; Yoshinori Kawashima, Saitama, all of Japan

[73] Assignee: Honda Giken Kogyo Kabushiki Kaisha, Tokyo, Japan

[21] Appl. No.: 618,200

[22] Filed: Jun. 7, 1984

[30] Foreign Application Priority Data

Jun. 7, 1983 [JP] Japan .................... 58-100131

[51] Int. Cl.⁴ ........................................ B60K 17/342
[52] U.S. Cl. ................................ 180/251; 180/241; 188/18 A
[58] Field of Search ............... 180/240, 241, 251, 233; 188/18 A

[56] References Cited

U.S. PATENT DOCUMENTS

| 2,334,980 | 11/1943 | Allen ............................. | 180/240 |
| 2,384,471 | 9/1945 | Keese et al. .................... | 180/233 |
| 3,048,233 | 8/1962 | Crain et al. .................... | 180/251 |
| 3,282,366 | 11/1966 | Sprague ......................... | 180/240 |
| 3,693,533 | 7/1975 | Tidwell .......................... | 180/233 |
| 3,703,216 | 11/1972 | Thibodeau ...................... | 180/251 |
| 3,758,129 | 9/1973 | Ishikawa et al. ............... | 188/18 A |
| 4,084,654 | 4/1978 | Dudek ............................ | 180/233 |

FOREIGN PATENT DOCUMENTS 2108221 5/1983 United Kingdom ............... 180/233

Primary Examiner—Albert J. Makay
Assistant Examiner—Steven E. Warner
Attorney, Agent, or Firm—Lyon & Lyon

[57] ABSTRACT

An all-wheel-drive vehicle having front and rear pairs of wheels drivable by power from an engine and vertically movably suspended from a vehicle body. The vehicle includes a power transmitting mechanism for transmitting the power from an engine output of the engine to one of the axles for the front and rear wheels, a power output unit mounted on said one of the axles, and a power transmission shaft for transmitting the power from the power output unit to the other of the axles of the front and rear wheels. The front and rear wheels are steerable simultaneously by linkage connected therebetween.

10 Claims, 14 Drawing Figures

ALL WHEEL DRIVE VEHICLE

BACKGROUND OF THE INVENTION

1. Field of the Invention

The present invention relates to a vehicle having all wheels drivable by an engine on the vehicle.

2. Description of the Prior Art

Conventional all-wheel drive vehicles such as four-wheel-drive vehicles have a speed change gear assembly coupled to an engine and include an output divided into two output members connected to input shafts of differentials for front and rear wheels. This prior layout has placed a limitation on the arrangement of the engine, speed change gear assembly, and differentials, and also on the type and construction of the speed change gear assembly that can be used. Accordingly, the conventional all-wheel-drive vehicles have had very little flexibility as to the car body designs that can be used.

SUMMARY OF THE INVENTION

It is an object of the present invention to provide an all-wheel-driven vehicle having a reduced limitation on the arrangement of the engine and speed change gear assembly and the type and construction of the speed change gear assembly, and relatively large degree of flexibility as to the car body designs.

According to the present invention, an all-wheel-drive vehicle comprises a body, an engine mounted on the body and having an output shaft, front and rear pairs of wheels drivable by power from the engine, the front and rear wheels being vertically movably suspended from the body, axles coupled to the front and rear wheels, a first power transmitting means for transmitting power from the output shaft of the engine to one of the axles of the front and rear wheels, a power output unit mounted on the one axle, and a second power transmitting means for transmitting power from the power output unit to the other of the axles of the front and rear wheels.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Overall construction

Figure 1:
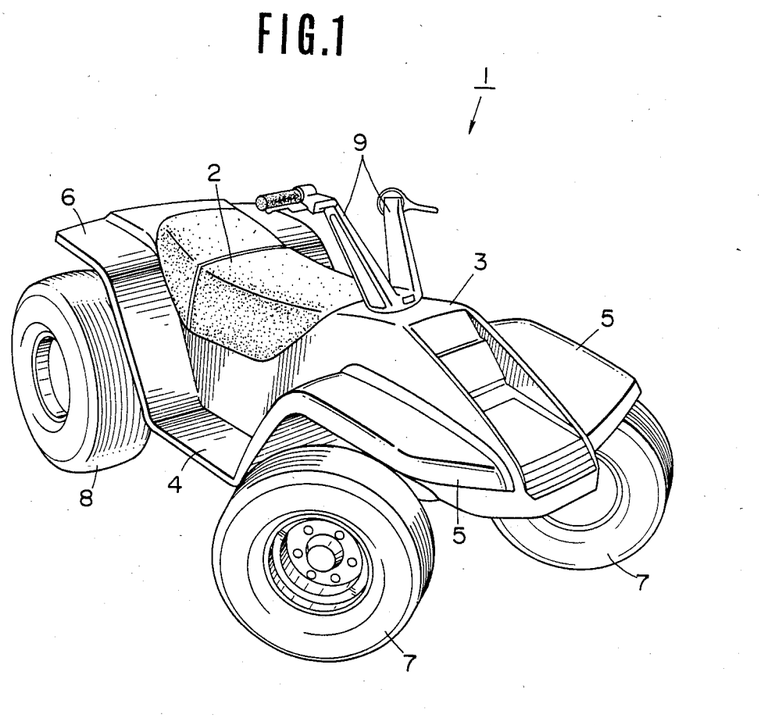
FIG. 1 is a perspective view of an all-wheel-drive vehicle according to the present invention.

As shown in FIG. 1, a four-wheel-driven vehicle 1 according to the present invention has a central saddle seat 2 similar to one on an ordinary motorcycle for allowing a driver to ride astride thereon. The vehicle 1 has a body cover 3 extending around the saddle seat 2 and including side steps 4 (only one shown), a front fender 5, and a rear fender 6 which are all of an integral construction.

Figure 2:
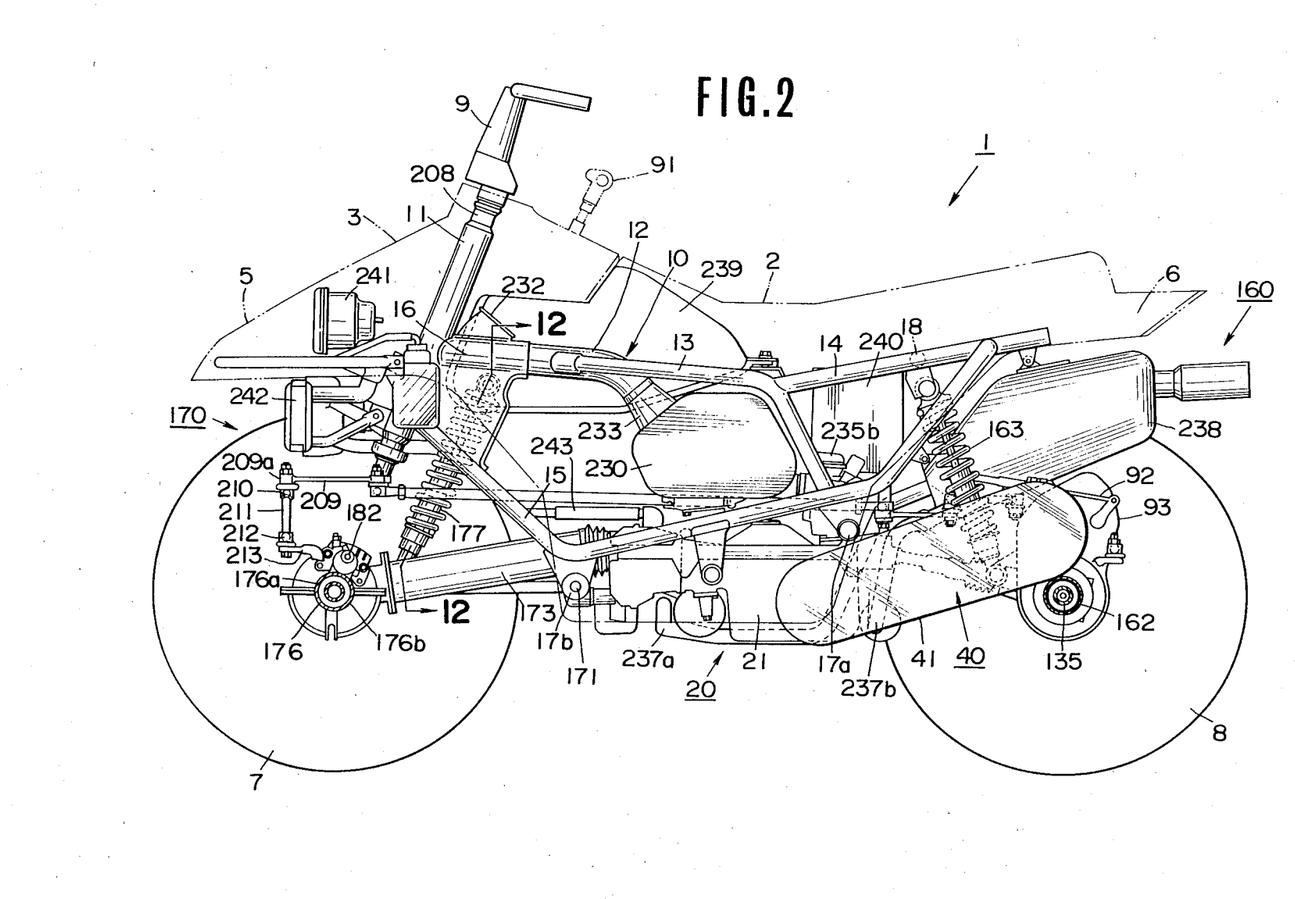
FIG. 2 is a side elevational view of a frame construction of the all-wheel-drive vehicle shown in FIG. 1.

The vehicle 1 has pairs of front and rear wheels 7, 8 having low-pressure tires that are angularly movable laterally in ganged relation by a bar-shaped steering handle 9. The front and rear wheels 7, 8 are drivable by power from a power unit 20 (FIG. 2).

Body frame

Figure 3:
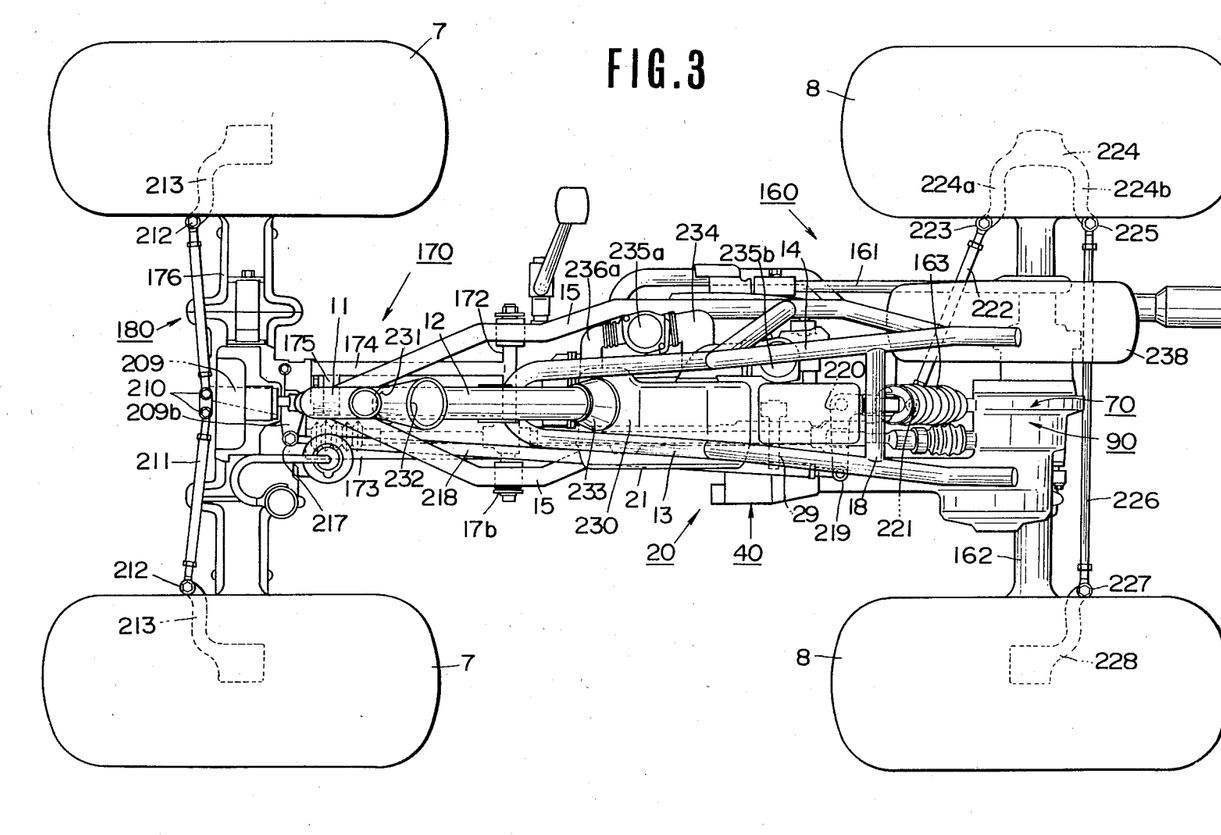
FIG. 3 is a plan view of the frame construction shown in FIG. 2.

The vehicle 1 includes a body frame 10 constructed similarly to that of an ordinary motorcycle. As illustrated in FIGS. 2 and 3, the body frame 10 is composed of a head pipe 11, a backbone tube 12 having a front end secured to the head pipe 11 and extending in a rearward direction from the head pipe 11, a pair of side pipes 13 having front ends secured to opposite sides of the backbone tube 12 and rear end portions curved downwardly, a pair of rear stays 14 having front ends secured to the curved rear end portions of the side pipes 13 and extending rearward therefrom, and down tubes 15 curved downwardly and having front ends secured to the head pipe 11, intermediate portions secured to the lower ends of the side pipes 13, and a rear ends secured to the rear stays 14. The head pipe 11, the backbone tube 12, and the down tubes 15 have front joined portions firmly reinforced by a reinforcement member 16.

Figure 9:
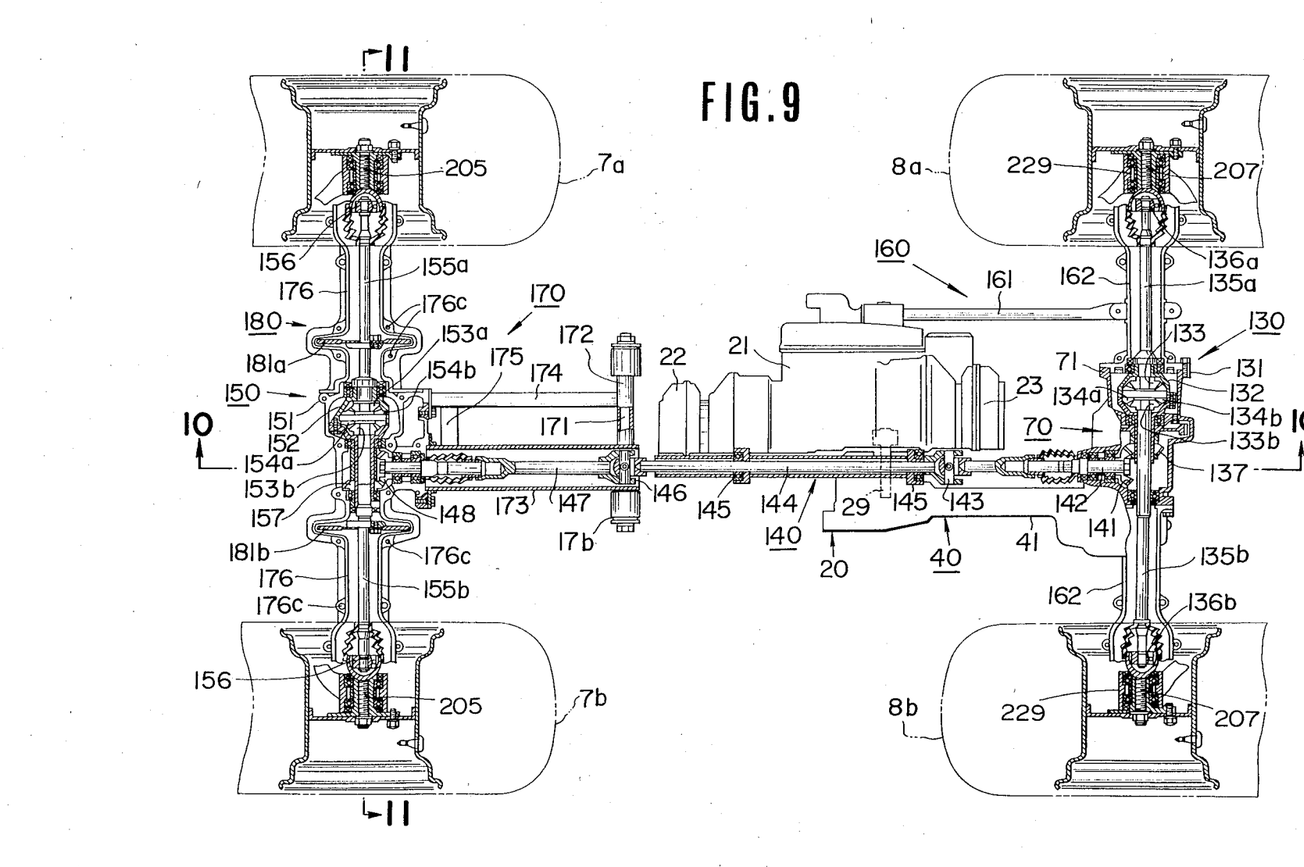
FIG. 9 is a fragmentary horizontal cross-sectional view of a power transmitting system.

Outline of a power system, power transmitting system, and a suspension system As shown in FIG. 9, the power unit 20 comprises a horizontal water-cooled two-cylinder gasoline engine 21 having cylinders 22, 23 extending horizontally in forward and backward directions, respectively, and a belt transmission 40 and a speed change gear assembly 70 disposed rearward of the engine 21. As shown in FIG. 2, the engine 21 is attached by a rubber mount 17a to the down tubes 15 of the body frame 10. Power from the engine 21 can be changed in speed continuously in a stepless manner by the belt transmission 40 and can be selectively modified by the speed change gear assembly 70 into two-speed forward modes, one-speed reverse mode, a neutral mode, and a parking mode while a clutch is automatically connected and disconnected. Output power from the speed change gear assembly 70 is transmitted through a rear differential 130 to rear wheels 8a, 8b.

From the rear differential 130, the power is transmitted to front wheels 7a, 7b through a front power transmitting system 140 and a front differential 150.

Figure 10:
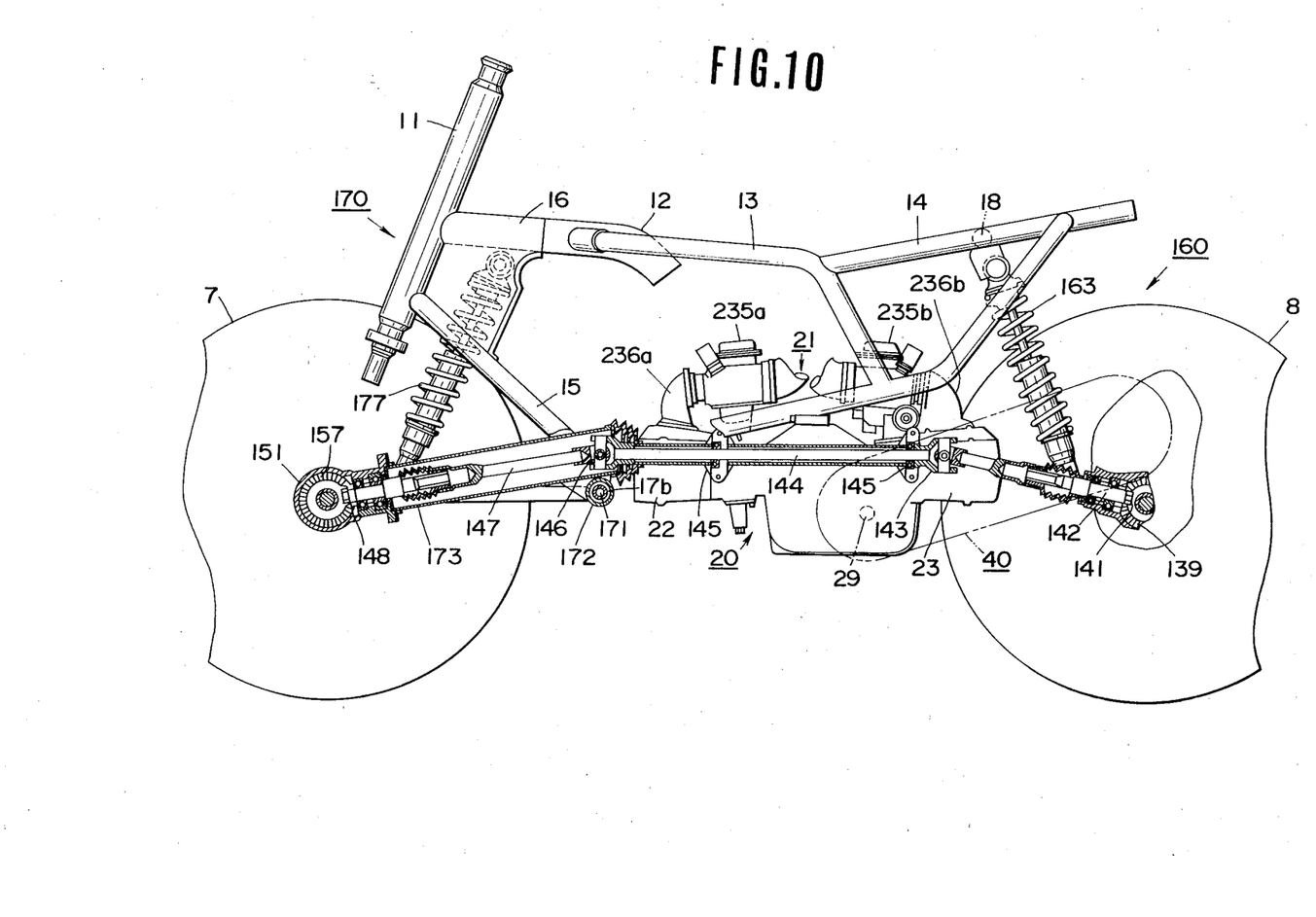
FIG. 10 is a longitudinal cross-sectional view taken along line 10—10 of FIG. 9.

A suspension system 160 for the rear wheels 8a, 8b will be described. As illustrated in FIGS. 9 and 10, a casing 41 of the belt transmission 40 and a rear fork 161 are supported for vertical angular movement about an output shaft 29 of the power unit 20. To the casing 41 are connected a casing 71 of the speed change gear assembly 70 and a casing 131 of the rear differential 130. A rear axle housing 162 is connected to the casing 131 of the rear differential 130 and a rear end of the rear fork 161. The rear wheels 8a, 8b are rotatably mounted on the rear axle housing 162. The rear axle housing 162 is therefore supported in a trailing arm manner for vertical angular movement about the engine output shaft 29 extending horizontally in a transverse direction.

As shown in FIG. 2, the rear stays 14 are interconnected by a cross member 18 from which the speed change gear assembly casing 71 of the power unit 20 is suspended through a single rear shock absorber 163.

As depicted in FIGS. 9 and 10, a suspension system 170 for the front wheels 7 is composed of a front axle tilt shaft 171 fitted in the down tubes 15 through rubber mounts 17b. A sleeve 172 is rotatably fitted over the tilt shaft 171 and fixed to ends of a hollow front power transmitting case 173 and a front fork 174 which have distal ends secured to a connector member 175 and a case 151 of the front differential 150, to which is coupled a front axle housing 176 that can be divided into upper and lower members.

More specifically, the front axle housing 176 is composed of separable upper and lower axle housing members 176a, 176b which are coupled to each other by bolts and nuts (not shown), the bolts extending through holes 176c defined in flanges formed on mating surfaces of the housing members 176a, 176b.

The front wheels 7a, 7b are rotatably supported on the front axle housing 176. The front axle housing 176 and the front wheels 7a, 7b are thus supported in a leading arm fashion for vertical angular movement about the front axle tilt shaft 171 extending horizontally in a transverse direction. Accordingly, the rear axle housing 162 and the front axle housing 176 are vertically movably suspended from the vehicle body in parallel relation to each other.

Figure 12:
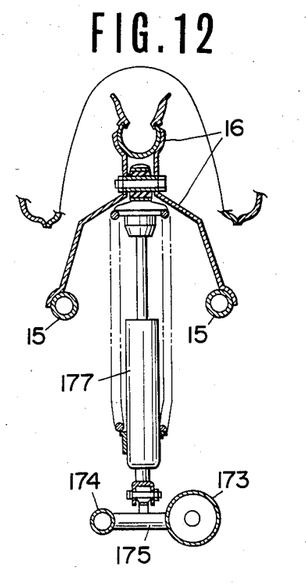
FIG. 12 is a cross-sectional view taken along line 12—12 of FIG. 2.

As shown in FIGS. 2 and 12, the front axle housing 176 and the connector member 175 joined to the front fork 174 are suspended by a front shock absorber 177 from the reinforcement member 16 of the body frame 10.

Power system

A system for starting the engine 21 will be described with reference to FIG. 4.

A crank gear 25 is fitted over a crank shaft 24 of the engine 21. A starter driven gear 28 is relatively rotatably fitted over a sleeve 27 fitted over the output shaft 29 rotatably supported parallel to the crank shaft 24. An output shaft gear 26 composed of double gears is fitted through splines over the output shaft 29. The sleeve 27 and the output shaft gear 26 are fastened against removal from the output shaft 29 by means of a nut 30 threaded over the output shaft 29.

Between the output shaft gear 26 and the starter driven gear 28, there is interposed a one-way clutch 31 coupled through a starter drive gear 32 to a starter gear 33. When a starter 34 is rotated, its torque is transmitted from the starter gear 33 through the starter drive gear 32, the starter driven gear 28, the one-way clutch 31, the output shaft gear 26, and the crank gear 25 to the crank shaft 24 to thereby start the engine 20.

Belt transmission

Figure 4:
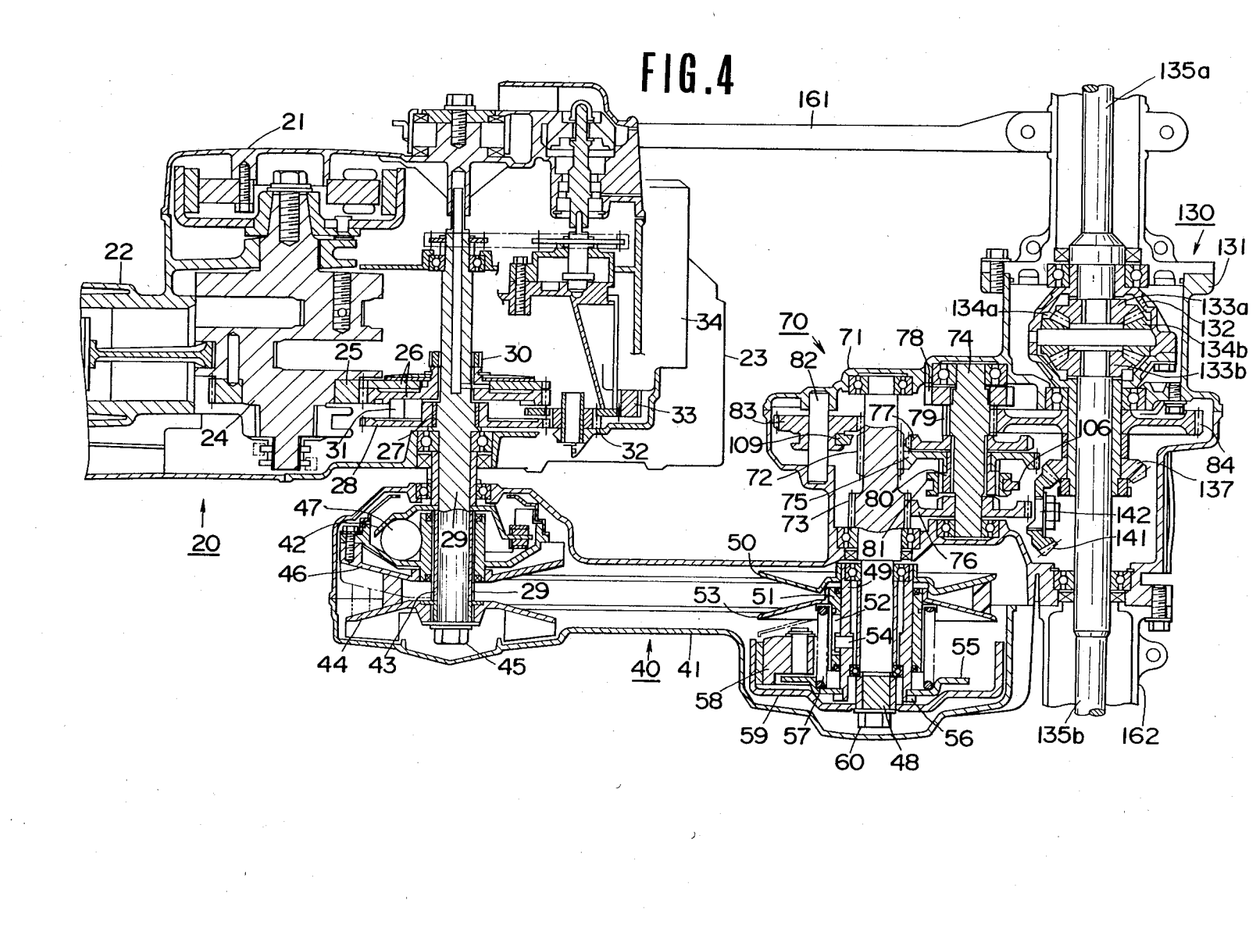
FIG. 4 is a horizontal cross-sectional view of an engine, a belt transmission, a speed change gear assembly, and a rear differential in the vehicle.

As shown in FIG. 4, the output shaft 29 of the engine 21 has one end projecting into a front portion of the belt transmission casing 41 and over which there are fitted a ramp plate 42, a drive face boss 43, and a fixed drive face 44 that are retained on the output shaft 29 by a nut 45.

A movable drive face 46 is axially movably splined over the drive face boss 43. Weight rollers 47 are interposed between a back surface of the movable drive face 46 and an inner surface of the ramp plate 42, the weight rollers 47 being angularly spaced at constant angular intervals in the circumferential direction.

A boss 49 is rotatably supported in a rear end of the casing 41, with a fixed driven face 50 fitted over the boss 49.

A driven cam 51 is loosely fitted over the boss 49, and a movable drive face 53 is fitted over the drive cam 51 for rotation therewith. A pin 54 projects into the boss 49 through an axial cam groove 52 defined in the driven cam 51. The driven cam 51 and the movable driven face 53 are axially movable relatively to the boss 49 while being guided by the cam groove 52.

A clutch inner plate 55 is securely fitted over the boss 49 with a compression coil spring 57 interposed between the movable driven face 53 and the clutch inner plate 55. A centrifugal clutch shoe 58 is pivotally mounted on the clutch inner plate 55 and is surrounded by a clutch outer member 59 securely fitted over a driven shaft 48 and retained thereon by a nut 60. When the fixed driven face 50 and the movable driven face 53 rotate beyond a predetermined speed, the torque is transmitted through the boss 49, the clutch inner plate 55, the centrifugal clutch shoe 58, the clutch outer member 59, and the driven shaft 48.

Gear system in speed change gear assembly

Figure 5:
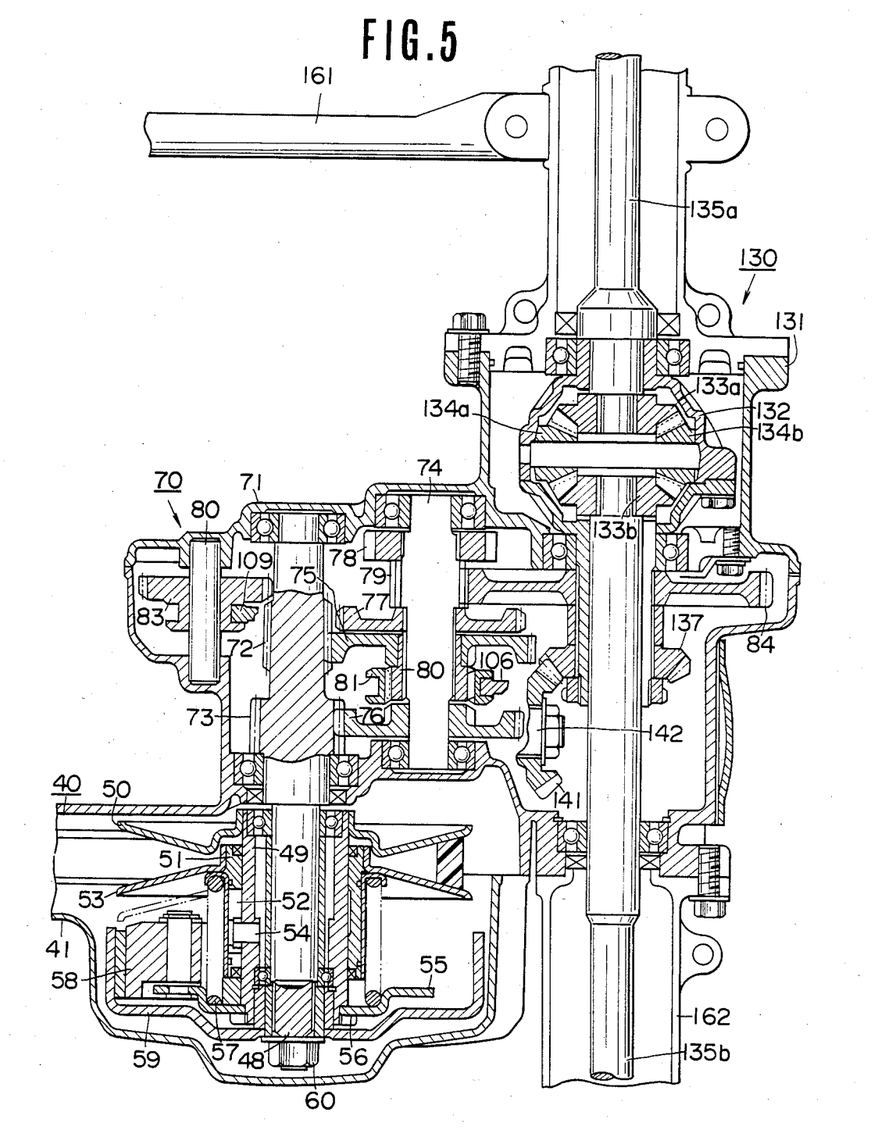
FIG. 5 is an enlarged horizontal cross-sectional view of the speed change gear assembly and the rear differential shown in FIG. 4.
Figure 6:
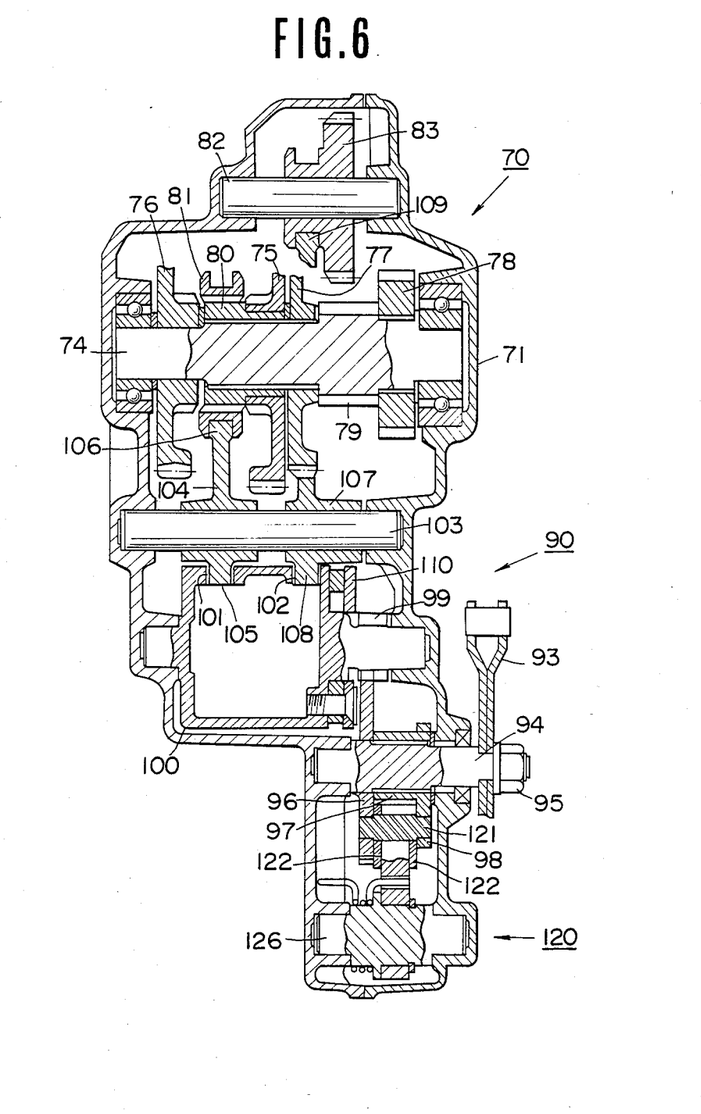
FIG. 6 is a cross-sectional view of the speed change gear assembly and its speed change control system.

As shown in FIGS. 5 and 6, the driven shaft 48 has an end projecting into the casing 71 of the speed change gear assembly 70 which is integrally joined to a righthand side (as seen in the forward direction of the vehicle) of the belt transmission casing 41. The driven shaft 48 in the casing 71 has an integral low-speed drive gear 72 and a high-speed drive gear 73.

A counter shaft 74 is rotatably supported in an intermediate portion of the casing 71 and extends parallel to the drive shaft 48, the counter shaft 74 having a final drive gear 79 integrally thereon.

A parking gear 78 is fitted through splines over a righthand end of the counter shaft 74. A reverse gear 77 and a shifter boss 80 are fitted through splines over the counter shaft 74 remotely from the parking gear 79 with the final drive gear 79 interposed therebetween. A high-speed drive gear 76 is rotatably fitted over the counter shaft 74 at a lefthand end thereof.

A low-speed driven gear 75 is rotatably fitted over the shifter boss 80 over which a shifter 81 is splined. The low-speed driven gear 75 and the high-speed driven gear 76 are constructed such that the shifter 81 can selectively be splined to the gear 75 or 76. The low-speed driven gear 75 or the high-speed driven gear 76 can selectively be coupled to the counter shaft 74 by moving the shifter 81 rightward or leftward into splined engagement selectively with the low-speed driven gear 75 or the high-speed driven gear 76.

A reverse idle gear 83 is axially movably and rotatably mounted by a reverse idle gear shaft 82 in a front portion of the belt transmission casing 71. The reverse idle gear 83, when axially moved, is brought into or out of mesh with the low-speed drive gear 72.

The final drive gear 79 is in mesh with a final gear 84 connected to a gear box 132 of the rear differential 130.

Speed change control system for speed change gear assembly

As shown in FIG. 2, a speed change control system 90 includes a change lever 91 positioned in a front portion of the body cover 3 behind the bar-shaped steering handle 9, the change lever 91 being pivotally movable in forward and rearward directions. The change lever 91 is coupled through a connector member 92 to a change arm 93 connected by a nut 95 to a change arm shaft 94 angularly movably supported in a rear portion of the speed change gear assembly casing 71. The change arm 93 and the change arm shaft 94 are angularly movable back and forth in response to back-and-forth angular movement of the change lever 91.

As illustrated in FIG. 6, a primary drum gear 96 is welded to the change arm shaft 94, and a sleeve 97 is fitted through splines over the change arm shaft 94. A support member 98 is welded to the sleeve 97.

A change drum 100 is rotatably supported in the casing 71 adjacent to the change arm shaft 94, and has an integral change gear 99 held in mesh with the primary drum gear 96.

A shift fork shaft 103 is journalled in the casing 71 adjacent to the change drum 100. A speed-switching shift fork 104 and a reverse shift fork 107 are fitted over the shift fork shaft 103. The change drum 100 has cam grooves 101, 102 in which are fitted, respectively, shift dowels 105, 108 of the shift forks 104, 107. The shift forks 104, 108 have engagement fingers 106, 109, respectively, engaging the shifter 81 and the reverse gear 77, respectively. When the change lever 91 is moved into a low-speed position, the change drum 100 is rotated to bring the shifter 81 into splined engagement with the low-speed driven gear 75 and the shifter boss 80. When the change lever 91 is moved into a high-speed position, the change drum 100 is rotated to bring the shifter 81 into splined engagement with the high-speed driven gear 76 and the shifter boss 80. When the change lever 91 is moved into a neutral position, the change drum 100 is rotated to bring the shifter 81 out of splined engagement with the low-speed driven gear 75 and the high-speed driven gear 76. When the change lever 91 is moved into a reverse position, the change drum 100 is rotated to bring the reverse idle gear 83 into mesh with the low-speed drive gear 72 of the driven shaft 48 and the reverse gear 77. During such gear shifting operation in the respective modes, the counter shaft 74 is rotated at a low speed and a high speed, is stopped and reversed, respectively.

Figure 7:
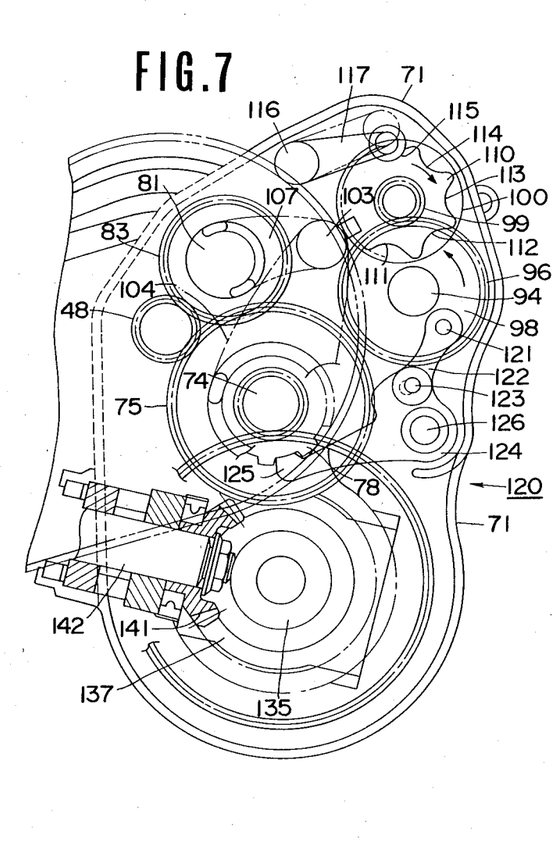
FIG. 7 is a schematic side elevational view of the speed change control system actuated for parking.
Figure 8:
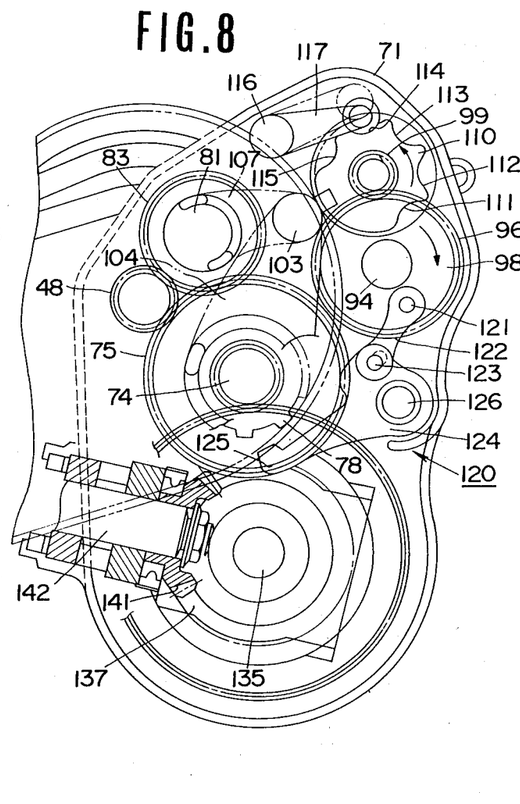
FIG. 8 is a schematic side elevational view of the speed change control system actuated for reversing.

As depicted in FIGS. 7 and 8, a lock plate 110 is secured to the change drum 100 and has a low-speed recess 111, a neutral recess 112, a high-speed recess 113, a reverse recess 114, and a parking recess 115. A change plate arm 117 is pivotally mounted on a plate arm shaft 116 journalled in the casing 71. A distal end of the change plate arm 117 is biased by a spring (not shown) to engage in one of the recesses 111, 112, 113, 114, 115 to secure the change drum 100 and the change arm shaft 94.

Parking system

A parking system 120 has a parking link 122 with one end thereof pivoted by a pin 121 to the primary drum gear 96 and the support member 98, and a parking arm 124 pivotally supported on a parking shaft 126 journalled in the casing 71. The other end of the parking link 122 and the parking arm 124 are interconnected by a pin 123. When the change lever 91 is shifted into the parking position to bring the end of the change plate arm 117 into the parking recess 115 in the lock plate 110, a parking pawl 125 is engaged by the parking gear 78 to fix the counter shaft 74 against rotation as shown in FIG. 7.

A spring (not shown) is interposed between the parking arm 124 and the parking pawl 125. When the parking pawl 125 hits a tooth of the parking gear 78 while the change lever 91 is in the parking position as illustrated in FIG. 7, the parking pawl 125 can clear the tool in the counterclockwise direction. When the parking gear 78 is slightly rotated from such a position, the parking pawl 125 can engage into a recess in the parking gear 78 under the resilience of the non-illustrated spring.

Rear differential

As shown in FIG. 5, the rear differential 130 has a casing 131 integral with the casing 71 of the speed change gear assembly, the gearbox 132 being rotatably supported in the casing 131. The final gear 84 is coupled to the gear box 132 for transmitting the output from the counter shaft 74 through the final drive gear 79 and the final gear 84 to the gear box 132.

The gear box 132 houses a pair of smaller differential gears 133a, 133b and a pair of larger differential gears 134a, 134b which are held in mesh with adjacent ones. Rear axles 135a, 135b are secured to the larger differential gears 134a, 134b. The rear wheels 8a, 8b are coupled through constant-velocity joints 136a, 136b (FIG. 9) to the rear axles 135a, 135b, respectively. Power from the power unit 20 is thus transmitted through the rear differential 130 in a differential manner to the rear wheels 8a, 8b.

A bevel gear 137 is fixed to the gear box 132.

Front power transmitting system

Figure 11:
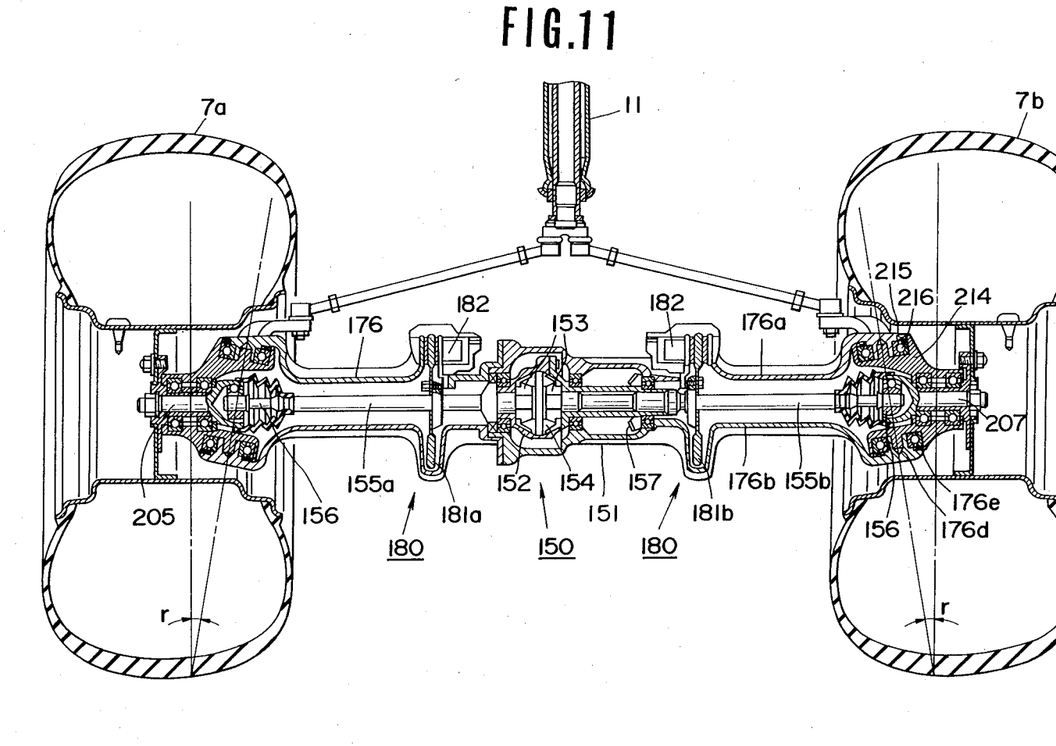
FIG. 11 is a transverse cross-sectional view taken along line 11—11 of FIG. 9, showing a front wheel support mechanism.

As depicted in FIGS. 9 and 11, a front power transmitting system 140 has a rear transmission shaft 142 rotatably supported in the rear differential casing 131. A bevel gear 141 is fitted over a rear end of the rear transmission shaft 142 in mesh with the bevel gear 137.

The rear transmission shaft 142 includes front and rear portions which are splined to each other. A central transmission shaft 144 has a rear end coupled through a constant-velocity joint 143 to the front end of the rear tranmission shaft 142. The central transmission shaft 144 is rotatably supported by a bearing 145 on the engine 21.

A front transmission shaft 147 is disposed in the front power transmission case 173 and has a rear end coupled to a front end of the central transmission shaft 144 through a constant-velocity joint 146 and a front end braked against rotation in response to operation of the brake calipers 182, 182.

Figure 13:
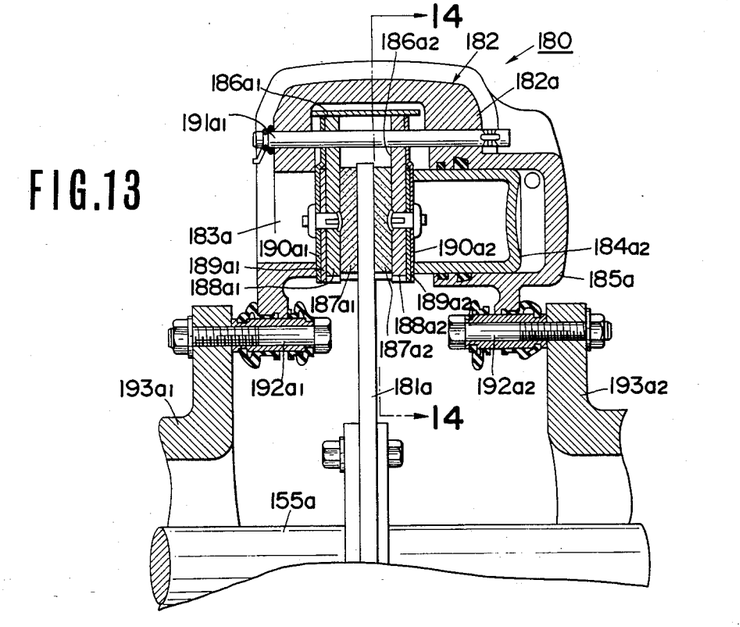
FIG. 13 is an enlarged cross-sectional view of a brake device.
Figure 14:
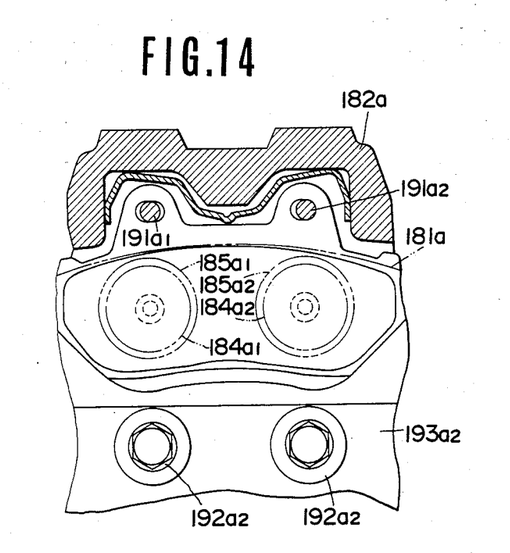
FIG. 14 is an enlarged cross-sectional view taken along line 14—14 of FIG. 13.

Since both brake systems 180 are of the same construction, only the lefthand brake system (as seen in FIG. 11) will be described with reference to FIGS. 13 and 14.

The brake caliper 182 comprises a caliper body 182a having a bearing member 183a, a pair of cylinders 185$a_1$, 185$a_2$, integral with the caliper body 182a, pistons 184$a_1$, 184$a_2$, slidably disposed in the cylinders 185$a_1$, 185$a_2$, and a pair of pad members 186$a_1$, 186$a_2$. The caliper body 182a is removably mounted by guide rods 191$a_1$, 191$a_2$. The brake disk 181a fixed to the front axle 155a is sandwiched between the pad members 186$a_1$, 186$a_2$, that are actuatable by the pistons 184$a_1$, 184$a_2$, that are in turn movable by oil supplied under pressure.

The pad members 186$a_1$, 186$a_2$, have linings 187$a_1$, 187$a_2$, with a high metal content against fading, secured to inner surfaces of holder plates 188$a_1$, 188$a_2$. Thermal insulating plates 189$a_1$, 189$a_2$, and retainers 190$a_1$, 190$a_2$ are securely attached to outer surfaces of the holder plates 188$a_1$, 188$a_2$.

When the cylinders 185$a_1$, 185$a_2$ are supplied with oil under pressure, the pistons 184$a_1$, 184$a_2$ project to enable the pad members 186$a_1$, 186$a_2$ to grip the brake disk 181a firmly therebetween. Thus, the lefthand front wheel 7a is controlled under frictional forces acting between the linings 187$a_1$, 187$a_2$ of the pad members 186$a_1$, 186$a_2$ and the brake disk 181a. The righthand front wheel 7b can be similarly braked when the righthand brake device is operated when oil under pressure is supplied.

Steering system

As shown in FIG. 2, a steering stem 208 is fitted in the head pipe 11 of the body frame 10 for angular movement about its own axis. The bar-shaped steering handle 9 is mounted on an upper end of the steering stem 208. A steering lever 209 is connected to the lower end of the steering stem 208 and has a front portion 209a linked to knuckle arms 213 through ball joints 210, front tie rods 211, and ball joints 212. The knuckle arms 213 are mounted on the front knuckles 214.

As shown in FIG. 11, the upper and lower axle housings 176a, 176b of the front axle housing 176 have on each of their opposite ends a kingpin recess 176d and a bearing sleeve 176e. A kingpin 215 of the front knuckle 214 is fitted in the kingpin recess 176d, while the front knuckle 214 is fitted in the bearing sleeve 176e with a bearing 216 interposed. The front knuckle 214 is angularly movable about the kingpin 214 inclined at an angle r to the vertical.

The front axles 155a, 155b have outer ends coupled via constant-velocity joints 156 to front wheel shafts 205 which are rotatably mounted on the front knuckles 214, the front wheels 7a, 7b being securely attached to the front wheel shafts 205.

As illustrated in FIGS. 3 and 9, the rear axle housing 162 has opposite ends with the same construction as that of the front axle housing 176, and rear knuckles 229 are of the same construction as that of the front knuckles 214 whereby they are angularly movable.

The rear axles 135a, 135b have outer ends coupled via the constant-velocity joints 136a, 136b to rear wheel shafts 207 which are rotatably mounted on the rear knuckles 229, the rear wheels 8a, 8b being securely attached to the rear wheel shafts 207.

The steering lever 209 has a lateral member 209b to which the front end of a steering rod 218 is pivotally connected through a ball joint 217. The steering rod 218 has a rear end pivotally connected by a ball joint 219 to one end of a bell crank 220 pivotally supported on the engine 21. The other end of the bell crank 220 is coupled through a ball joint 221 to a rear tie rod 222, and a ball joint 223 to a front portion 224a of a righthand rear knuckle arm 224. A rear portion 224b of the knuckle arm 224 is coupled through a ball joint 225, a connecting rod 226, and a ball joint 227 to a lefthand rear knuckle arm 228.

The righthand and lefthand rear knuckle arms 224, 228 are connected to the rear knuckles 229, respectively.

Engine intake and exhaust system

As illustrated in FIGS. 2, 3 and 10, the backbone tube 12 of the body frame 10 has an intake port 231 defined in a front upper surface thereof, with a rubber intake duct 232 fitted in the intake port 231. The backbone tube 12 has a rear end connected through a rubber connector tube 233 to an inlet port (not shown) of an air cleaner 230, which has an outlet port connected through a connector pipe 234, front and rear carburetors 235a, 235b, and intake pipes 236a, 236b to intake ports (not shown) of the front and rear cylinders 22, 23.

As shown in FIG. 2, exhaust ports (not shown) of the front and rear cylinders 22, 23 are connected to an exhaust muffler 238 through exhaust pipes 237a, 237b, respectively.

Other accessories

As depicted in FIG. 2, a fuel tank 239 is disposed downwardly and forward of the saddle seat 2. A battery 240 is disposed substantially above the rear carburetor 235b. A headlight 241 and a radiator 242 are vertically spaced from each other and located in front of the head pipe 11, the radiator 242 being connected through a water hose 243 to the engine 21.

The all-wheel-drive vehicle of the foregoing construction will be operated as follows:

Speed change control and parking control

When the change lever 91 is shifted into the low-speed position, the change arm 93 is angularly moved through the connector member 92 and so are the change arm shaft 94 and the primary drum gear 96. The change drum 100 and the lock plate 110 are rotated therewith via the change gear 99 to cause the distal end of the change plate arm 117 to engage in the low-speed recess 111. Under this condition, speed-switching shift fork 104 fitted in the cam groove 101 in the change drum 100 is moved to the right( as seen in FIG. 10) to bring the shifter 81 into meshing engagement with the splines of the shifter boss 80 and the low-speed driven gear 75. The low-speed driven gear 75 which is always held in mesh with the low-speed drive gear 72 on the driven shaft 78 in the belt transmission 40 is now coupled with the shifter boss 80 splined on the counter shaft 74. In this manner the driven shaft 48 in the belt transmission 40 is coupled to the gear box 132 of the rear differential 130 through the final gear 84 at a low-speed gear ratio. The parking pawl 125 is out of mesh with the parking gear 78 at this time.

When the change lever 91 is moved into the neutral position, the change drum 100 and the lock plate 110 are rotated thereby to enable the distal end of the change plate arm 117 to engage in the neutral recess 112. Under this condition, the shifter 81 is placed out of mesh with the splines of the low-speed driven gear 75 as shown in FIG. 6 to disconnect the shifter boss 80 from the low-speed driven gear 75. The torque from the driven shaft 48 in the belt transmission 40 is no longer transmitted to the gear box 132 of the rear differential 130.

When the change lever 91 is shifted into the high-speed position, the change drum 100 and the lock plate 110 are rotated thereby to cause the distal end of the change plate arm 117 to engage in the high-speed recess 113. The shifter 81 is now moved into mesh with the splines of high-speed driven gear 76, whereupon the driven shaft 48 in the belt transmission 40 is coupled to the gear box 132 of the rear differential 130 at a high-speed gear ratio.

When the change lever 91 is moved into the reverse position, the change drum 100 and the lock plate 110 are rotated thereby to cause the distal end of the change plate arm 117 to enage in the reverse recess 114. The reverse shift fork 107 is moved to the left to cause the reverse idle gear 83 to mesh with the low-speed drive gear 72 and the reverse gear 77. Rotation of the driven shaft 48 in the belt transmission 40 is now transmitted, as reversed in direction, to the gear box 132 of the rear differential 130.

When the change lever 91 is shifted into the parking position, the change drum 100 and the lock plate 110 are rotated thereby to cause the distal end of the change plate arm 117 to engage in the parking recess 115. Now, the shifter 81 is brought out of mesh with the splines of the low-speed driven gear 75 and the high-speed driven gear 76, and the reverse idle gear 83 are also brought out of mesh with the low-speed drive gear 72 and the reverse gear 77. At the same time, as shown in FIG. 7, the lock plate 110 is in the limit position in its clockwise rotation, and hence the support member 98 is rotated to the limit position in the counterclockwise rotation to cause the parking pawl 125 to engage the parking gear 78. The final drive gear 79 coupled to the parking gear 78 is now fixed in position to lock the front and rear wheels 7, 8.

Engine starting

When the engine 21 is at rest, no centrifugal forces act on the weight rollers 47, and the movable drive face 46 is spaced farthest away from the fixed drive face 44. At this time, the belt transmission 40 has a smallest speed change ratio. The centrifugal clutch shoe 58 is spaced from the clutch outer member 59, so that the automatic centrifugal clutch is disconnected.

As the starter 34 is energized, its torque is transmitted to the crank shaft 24 through the starter gear 33, the starter drive gear 32, the one-way clutch 31, the output shaft gear 26, and the crank gear 25 to thereby start the engine 21.

Once the engine 21 has started operating, the engine torque is transmitted from the output shaft 29 to the fixed drive face 44 and movable drive face of the belt transmission 40. Since the one-way clutch 31 disconnects the starter 34 from the engine 21, no engine torque is transmitted to the starter 34, which is therefore prevented from being forcibly driven by the engine 21.

Running of the vehicle

As the speed of rotation of the engine 21 is progressively increased while the change lever 91 is in the low-speed gear position, increasing centrifugal forces are applied to the weight rollers 47 to move the movable drive face 46 toward the fixed drive face 44. The speed change ratio of the belt transmission 40 is progressively increased, and the centrifugal clutch shoe 58 contacts the clutch outer member 59, whereupon the automatic centrifugal clutch is connected.

The driven shaft 48 of the belt transmission 40 starts rotating to transmit the torque through the low-speed drive gear 72, the low-speed driven gear 75, the shifter 81, the shifter boss 80, the counter shaft 74, the final drive gear 79, and the final gear 84 to the gear box 132 of the rear differential 130.

Where there is no difference between running resistances to the rear wheels 8a, 8b, the smaller and larger differential gears 133, 134 of the rear differential 130 are not rotated about their own axes, and the torque from the gear box 132 is transmitted through the rear axles 135a, 135b and the constant-velocity joints 136a, 136b to the rear wheels 8a, 8b, which are driven to rotate at the low speed.

The torque from the gear box 132 of the rear differential 130 is transmitted to the bevel gear 157 of the front differential 150 from the bevel gear 135 to the bevel gear 141, the rear transmission shaft 142, the constant-velocity joint 143, the central transmission shaft 144, the constant-velocity joint 146, the front transmission shaft 147, and the bevel gear 148 of the front power transmitting system 140.

Where there is no difference between running resistances to the front wheels 7a, 7b, the torque from the bevel gear 157 is transmitted through the gear box 152, the front axles 155a, 155b and the constant-velocity joints 156 to the front wheels 7a, 7b, which are now driven to rotate at the low speed.

Where there is a difference between running resistances to the front wheels 7a, 7b and also to the rear wheels 8a, 8b, the front and rear differentials 150, 130 operate in the same manner as ordinary differentials, so that the speed of rotation of the wheel subjected to the higher running resistance is reduced while the speed of rotation of the wheel subjected to the lower running resistance is increased to allow the vehicle to turn smoothly.

When the change lever 91 is shifted into the high-speed position or the reverse position, the speed change control system 90 responds to cause the final gear 84 of the speed change gear assembly 40 to rotate at the high speed or be reversed, whereupon the vehicle runs at the high speed or moves backward.

While in the illustrated embodiment the differentials are provided for both of the front and rear wheel axles, only one differential may be provided for the axle for the front wheels which are steerable.

Advantages of the vehicle

The belt transmission casing 41 serves the same purpose as that of the rear fork 161 in the rear wheel suspension system 160, and the hollow front power transmitting case 173 serves the same purpose as that of the front fork 174 in the front wheel suspension system 170, with the front transmission shaft 147 in the front power transmitting system 140 being disposed in the front power transmitting case 173. Therefore, the belt transmission casing 41 and the front power transmitting case 173 perform the double functions of the suspension and power transmitting systems, and hence those systems are compact in size, are constructed of a reduced number of parts, and can be manufactured at a reduced cost.

Since the front wheel axles 155a, 155b and the rear wheel axles 135a, 135b are movable up and down in mutually parallel relation, the two shock absorbers 163, 177 are sufficient for the respective front and rear wheels, and consequently the width of the vehicle can be as small as possible.

The front axle is disposed in the vertically separable axle case, and the brake disks are mounted on the front axle with the brake calipers attached to the axle case. The brake devices can therefore be protected from the exterior, and the wheels can be smaller in size than would be possible with brakes attached in the usual manner to the inner sides of the wheels.

The knuckles supporting the steerable wheels are sandwiched between the separable axle case members, and hence the kingpins can be easily and simply mounted in place.

The output from the final gear 84 serving as the output end of the speed change gear assembly 70 is transmitted through the rear differential 130 to the rear wheels 8a 8b, and also from the rear differential 130 through the front power transmitting system 140 and the front differential 150 to the front wheels 7a, 7b. This arrangement has a high power transmission efficiency.

Since the speed change and parking operations can be accomplished by the single change lever 91 and the connector member 92, the gear shift operation is easy and reliable to perform, and the cost and weight of such a gear shift control arrangement is advantageously small.

The engine 21 is separated by the output shaft 29 from the belt transmission 40, the speed change gear assembly 70, the rear differential 130, the front power transmitting system 140, and the front differential 150. Accordingly, any undesirable vibrations and noise from the case of the engine 21 are substantially isolated from transmission to the belt transmission 40, the speed change gear assembly 70, the rear differential 130, the front power transmitting system 140, and the front differential 150, with the result that the rider will have good riding comfort.

Since the engine 21 which is the heaviest part of the vehicle is suspended from the body frame 10, the unsprung weight of the rear wheels 8 is smaller than a swing-unit-type power unit in which the engine, belt transmission, and speed change gear assembly are of an integral construction.

With the arrangement of the invention, briefly summarized, front and rear pairs of wheels are vertically movably suspended from a vehicle body, and the output shaft of a power unit mounted on the body is connected to either the front or rear wheel axles which has a power output unit coupled through a power transmission shaft to the other wheel axle. The power unit can be installed in a place most appropriate from the standpoint of the entire vehicle layout in view of the wheels and the body construction, and therefore the overall vehicle can freely be designed as desired.

Although there have been described what are at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. An all-wheel-drive vehicle comprising:
 (a) a body;
 (b) an engine mounted on said body and having an output shaft;
 (c) front and rear pairs of wheels drivable by power from said engine, said front and rear wheels being vertically movably suspended from said body;
 (d) axles coupled to the front and rear wheels;
 (e) first power transmitting means for transmitting power from said output shaft of the engine to one of said axles of the front and rear wheels;
 (f) a power output unit mounted on said one axle; and
 (g) second power transmitting means for transmitting power from said power output unit to the other of said axles of the front and rear wheels.

2. An all-wheel-drive vehicle according to claim 1, wherein said front and rear pairs of wheels have low-pressure tires, including a first single rigid axle member supporting said front pair of wheels and a second single rigid axle member supporting said rear pair of wheels, said first and second axle members extending substantially parallel to each other and being vertically movably suspended from said body.

3. An all-wheel-drive vehicle according to claim 2, including a single shock absorber connected between said first axle member and said body and another single shock absorber connected between said second axle member and said body.

4. An all-wheel-drive vehicle according to claim 2, wherein said first rigid axle member is composed of a pair of first and second front axle portions, including a front differential connected between said first and second front axle portions.

5. An all-wheel-drive vehicle according to claim 2, wherein said second rigid axle member is composed of a pair of first and second rear axle portions, including a rear differential connected between said first and second rear axle portions.

6. An all-wheel-drive vehicle according to claim 2, further including a plurality of fork members having ends pivotally supported on said body and angularly movable about shafts extending transversely of said body, said first and second axle members being coupled to the other ends of said fork members, and a plurality of casings accommodating said first and second power transmitting means, respectively, said casings doubling as said fork members.

7. An all-wheel-drive vehicle according to claim 2, wherein said front pair of wheels have knuckles to allow the front pair of wheels to be steerable, said knuckles being angularly movably coupled to said first axle member, said first axle member comprising an axle housing accommodating therein the axle of the front wheels and composed of two half bodies separated along a plane extending axially thereof, said knuckles being supported between said half bodies of said axle housing.

8. An all-wheel-drive vehicle according to claim 2, wherein one of said first and second axle members comprises a separable axle housing accommodating therein one of the axles and having a parting surface extending axially thereof, including a brake disk mounted on said last-mentioned one axle, and a brake caliper mounted in said separable axle housing.

9. An all wheel-drive vehicle comprising:
 (a) a body;
 (b) an engine mounted on said body and having an output shaft;
 (c) front and rear pairs of wheels drivable by power from said engine, said front and rear wheels being vertically movably suspended from said body and having low-pressure tires;
(d) a first single rigid axle member supporting said front pair of front wheels and a second single rigid axle member supporting said rear pair of wheels, said first and second single rigid axle members extending substantially parallel to each other and being vertically movably suspended from said body;
(e) a differential means fixed to either one of said first and second single rigid axle members;
(f) first power transmitting means for transmitting power from said output shaft of the engine to said one of first and second single rigid axle members, the first power transmitting means including a belt transmission means connected to the said output shaft;
(g) a power output unit mounted on said one single rigid axle member; and
(h) second power transmitting means for transmitting power from said power output unit to the other of said single rigid axle members, the second transmitting means including transmission shaft means rotatably supported in the said differential means.

10. An all-wheel-drive vehicle according to claim 9, wherein said first power transmitting means includes a first shaft and a second shaft, and the power from said power output is transmitted to said first shaft through a belt transmission and is then transmitted to said one of said first and second single rigid axle members through the second shaft.

* * * * *